US009910583B2

(12) United States Patent
Xie

(10) Patent No.: US 9,910,583 B2
(45) Date of Patent: Mar. 6, 2018

(54) METHOD AND APPARATUS FOR PROGRAM EXCEUTION BASED ICON MANIPULATION

(71) Applicant: Huawei Technologies Co., Ltd., Shenzhen, Guangdong (CN)

(72) Inventor: Gengsheng Xie, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 957 days.

(21) Appl. No.: 14/023,984

(22) Filed: Sep. 11, 2013

(65) Prior Publication Data
US 2014/0123044 A1  May 1, 2014

Related U.S. Application Data

(63) Continuation of application No. PCT/CN2013/075098, filed on May 3, 2013.

(30) Foreign Application Priority Data

Oct. 29, 2012  (CN) .......................... 2012 1 0419361

(51) Int. Cl.
G06F 3/048 (2013.01)
G06F 3/0486 (2013.01)
G06F 3/0481 (2013.01)

(52) U.S. Cl.
CPC ........ G06F 3/0486 (2013.01); G06F 3/04817 (2013.01)

(58) Field of Classification Search
CPC .......................... G06F 3/0486; G06F 3/04817
See application file for complete search history.

(56) References Cited

U.S. PATENT DOCUMENTS 5,664,133 A    9/1997  Malamud et al.
7,834,861 B2  11/2010  Lee
8,566,696 B1 * 10/2013  Hamon ............. G06F 17/30899
                                                       715/205

(Continued)

FOREIGN PATENT DOCUMENTS

CN    101714057 A    5/2010
CN    102043580 A    5/2011

(Continued)

Primary Examiner — Kieu Vu
Assistant Examiner — Asteway T Gattew

(57) ABSTRACT

The invention discloses a method and an apparatus for executing a program. The method includes: obtaining a related operation item of an object to be operated, and displaying an operation icon corresponding to the related operation item, and a direction of pointing from an original display coordinate of the object to be operated towards a display coordinate of the operation icon is an operation icon direction; according to the original display coordinate of the object to be operated and a display coordinate of the object after being dragged by the user, calculating a movement direction of the object to be operated; and starting to execute a functional operation corresponding to the operation icon when it is detected that the movement direction of the object to be operated is the same as the operation icon direction. Therefore, the invention can simplify program executing steps, and make operations intuitive and natural.

16 Claims, 7 Drawing Sheets

(56) References Cited

U.S. PATENT DOCUMENTS

| | | |
|---|---|---|
| 2003/0064757 A1 | 4/2003 | Yamadera et al. |
| 2005/0235293 A1 | 10/2005 | Fortes et al. |
| 2008/0074399 A1* | 3/2008 | Lee .................. G06F 3/0482 345/173 |
| 2008/0313568 A1* | 12/2008 | Park .................. G06F 3/04817 715/835 |
| 2009/0113330 A1* | 4/2009 | Garrison ............... G06F 3/0486 715/769 |
| 2009/0213086 A1 | 8/2009 | Chae et al. |
| 2010/0085318 A1 | 4/2010 | Lee et al. |
| 2010/0122194 A1* | 5/2010 | Rogers ................ G06F 3/04817 715/769 |
| 2011/0087981 A1* | 4/2011 | Jeong ................. G06F 3/04817 715/765 |
| 2011/0258582 A1* | 10/2011 | Bang .................. G06F 3/04817 715/811 |
| 2012/0030567 A1 | 2/2012 | Victor |
| 2013/0346896 A1* | 12/2013 | Missout ............... G06F 9/4421 715/769 |

FOREIGN PATENT DOCUMENTS

| | | |
|---|---|---|
| CN | 102236525 A | 11/2011 |
| CN | 102968259 A | 3/2013 |
| EP | 2 378 404 A1 | 10/2011 |

* cited by examiner

METHOD AND APPARATUS FOR PROGRAM EXECUTION BASED ICON MANIPULATION

CROSS-REFERENCE TO RELATED APPLICATIONS

This application is a continuation of International Application No. PCT/CN2013/075098, filed on May 3, 2013, which claims priority to Chinese Patent Application No. 201210419361.0, filed on Oct. 29, 2012, both of which are hereby incorporated by reference in their entireties.

TECHNICAL FIELD

The present invention relates to the field of computer technologies, and in particular, to a method and an apparatus for executing a program.

BACKGROUND

On a user interface of a computer application, when a user selects an object (such as an installation package of an application Google App Engine), operations related to the object are generally displayed to the user in the form of a pop-up context menu. When a menu item is selected, a function or action corresponding to the menu item starts to be executed. After the execution is completed, a result of the execution is fed back on the user interface that changes visually.

FIG. 1 is a schematic diagram of a pop-up context menu interaction method in the prior art, as described below:

S11: An object (that is, an installation package of an application Google App Engine) is not selected by a user.

S12. An object is selected by the user.

S13. After the object is right-clicked by the user with a mouse, a context menu pops up, where the menu displays operations related to the object, including an Install menu item and a Delete menu item.

S14. The Delete menu item is selected by the user.

S15. An operation confirmation dialog box pops up, prompting the user to confirm whether to delete the file.

S16. After a "Yes" confirmation button is selected by the user, an operation of deleting the object starts to be executed.

S17. After the operation of deleting the object is completed, the object disappears.

The pop-up context menu interaction method has the following disadvantages: The user and the system need to perform cross-responses and interactions, the operation steps are complicated and not intuitive enough, and interrupt the continuity of user operations.

SUMMARY

Multiple aspects of embodiments of the present invention provide a method for executing a program and an apparatus for executing a program, which can simplify steps of executing a computer program and make operations intuitive and natural.

In a first aspect, an embodiment of the present invention provides a method for executing a program, including: obtaining a related operation item of an object to be operated, and displaying, on a display screen, an operation icon corresponding to the related operation item, where the object to be operated is a computer program operable by a user on the display screen, and a direction of pointing from original a display coordinate of the object to be operated towards a display coordinate of the operation icon is an operation icon direction; according to the original display coordinate of the object to be operated and a display coordinate of the object after being dragged by the user, calculating a movement direction of the object to be operated; and starting to execute a functional operation corresponding to the operation icon when it is detected that the movement direction of the object to be operated is the same as the operation icon direction.

In a first implementation manner, the obtaining a related operation item of an object to be operated, and displaying, on a display screen, an operation icon corresponding to the related operation item, includes: analyzing a type and a state of the object to be operated, and obtaining the related operation item of the object to be operated; generating the operation icon corresponding to the related operation item and the display coordinate of the operation icon according to the related operation item; and displaying the operation icon on the display screen according to the display coordinate of the operation icon, where the operation icon direction corresponding to the operation icon is unique.

With reference to the first aspect or the first implementation manner of the first aspect, in a second implementation manner, the method further includes: continuing to execute the functional operation corresponding to the operation icon if it is detected that the object to be operated moves continuously along the operation icon direction.

With reference to the second implementation manner, in a third implementation manner, the method further includes: continuing to execute the functional operation corresponding to the operation icon until completion if it is detected that the object to be operated moves along the operation icon direction to a region of the operation icon.

With reference to the first aspect or the first implementation manner of the first aspect, in a fourth implementation manner, the method further includes: suspending executing the functional operation corresponding to the operation icon if it is detected that the display coordinate of the object to be operated remains unchanged and the object to be operated is not released by the user.

With reference to the first aspect or the first implementation manner of the first aspect, in a fifth implementation manner, the method further includes: stopping executing the functional operation corresponding to the operation icon and rolling back the executed functional operation if it is detected that the object to be operated is released by the user without being moved to a region of the operation icon.

With reference to the first aspect, or the first implementation manner of the first aspect, or the second implementation manner of the first aspect, or the third implementation manner of the first aspect, or the fourth implementation manner of the first aspect, or the fifth implementation manner of the first aspect, in a sixth implementation manner, the method further includes: displaying, on the display screen, an indicative arrow whose direction is consistent with the operation icon direction when it is detected that the movement direction of the object to be operated is the same as the operation icon direction; after starting to execute the functional operation corresponding to the operation icon, prolonging a length of the indicative arrow according to a processing progress of the functional operation; and in a process of rolling back the executed functional operation corresponding to the operation icon, shortening the length of the indicative arrow according to a rollback progress.

In a second aspect, an embodiment of the present invention provides an apparatus for executing a program, including: an operation icon generating unit, configured to obtain a related operation item of an object to be operated, and display, on a display screen, an operation icon corresponding to the related operation item, where the object to be operated is a computer program operable by a user on the display screen, and a direction of pointing from an original display coordinate of the object to be operated towards a display coordinate of the operation icon is an operation icon direction; a movement direction calculating unit, configured to: according to the original display coordinate of the object to be operated and a display coordinate of the object after being dragged by the user, calculate a movement direction of the object to be operated; and an execution starting unit, configured to start to execute a functional operation corresponding to the operation icon when it is detected that the movement direction of the object to be operated is the same as the operation icon direction.

With reference to the second aspect, in a first implementation manner, the operation icon generating unit specifically includes: an analyzing subunit, configured to analyze a type and a state of the object to be operated, and obtain the related operation item of the object to be operated; a generating subunit, configured to generate the operation icon corresponding to the related operation item and the display coordinate of the operation icon according to the related operation item; and a displaying subunit, configured to display the operation icon on the display screen according to the display coordinate of the operation icon, where the operation icon direction corresponding to the operation icon is unique.

With reference to the second aspect or the first implementation manner of the second aspect, in a second implementation manner, the apparatus further includes: an execution continuing unit, configured to continue to execute the functional operation corresponding to the operation icon if it is detected that the object to be operated moves continuously along the operation icon direction.

With reference to the second implementation manner, in a third implementation manner, the apparatus further includes: an execution confirming unit, configured to continue to execute the functional operation corresponding to the operation icon until completion if it is detected that the object to be operated moves along the operation icon direction to a region of the operation icon.

With reference to the second aspect or the first implementation manner of the second aspect, in a fourth implementation manner, the apparatus further includes: an execution suspending unit, configured to suspend executing the functional operation corresponding to the operation icon if it is detected that the display coordinate of the object to be operated remains unchanged and the object is not released by the user.

With reference to the second aspect or the first implementation manner of the second aspect, in a fifth implementation manner, the apparatus further includes: an execution stopping unit, configured to stop executing the functional operation corresponding to the operation icon and roll back the executed functional operation if it is detected that the object to be operated is released by the user without being moved to a region of the operation icon.

With reference to the second aspect, or any one of the implementation manners of the second aspect presented in this invention, in a sixth implementation manner, the apparatus further includes: an arrow indicating unit, configured to display, on the display screen, an indicative arrow whose direction is consistent with the operation icon direction when it is detected that the movement direction of the object to be operated is the same as the operation icon direction; and an arrow synchronizing unit, configured to: after the functional operation corresponding to the operation icon starts to be executed, prolong a length of the indicative arrow according to a processing progress of the functional operation; and in a process of rolling back the executed functional operation corresponding to the operation icon, shorten the length of the indicative arrow according to a rollback progress.

In the method for executing a program and the apparatus for executing a program in the embodiments of the present invention, a related operation icon of an object to be operated is displayed near the object to be operated on a display screen; by detecting the direction in which a user drags the object to be operated and the region of the operation icon to which the object is dragged, the function and action processing corresponding to the operation icon is implemented. According to the embodiments of the present invention, the user drags an object to execute the related function and action processing of a computer program, which can simplify steps of executing the computer program; moreover, the user-centered interaction ensures continuity of user thinking and operations, and makes the operations intuitive and natural.

BRIEF DESCRIPTION OF DRAWINGS

To illustrate the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
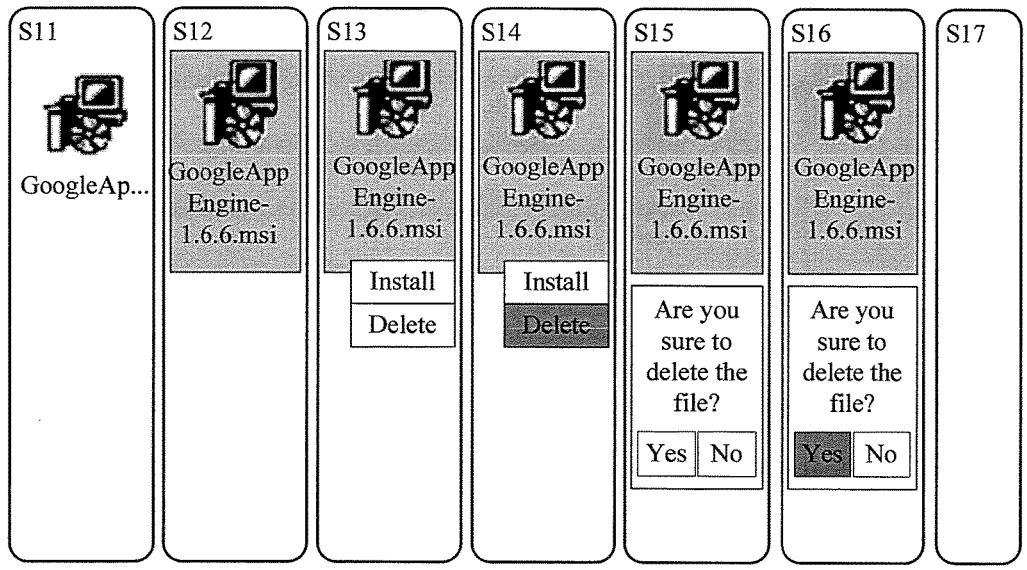
FIG. 1 is a schematic diagram of a pop-up context menu interaction method in a prior art.
Figure 2:
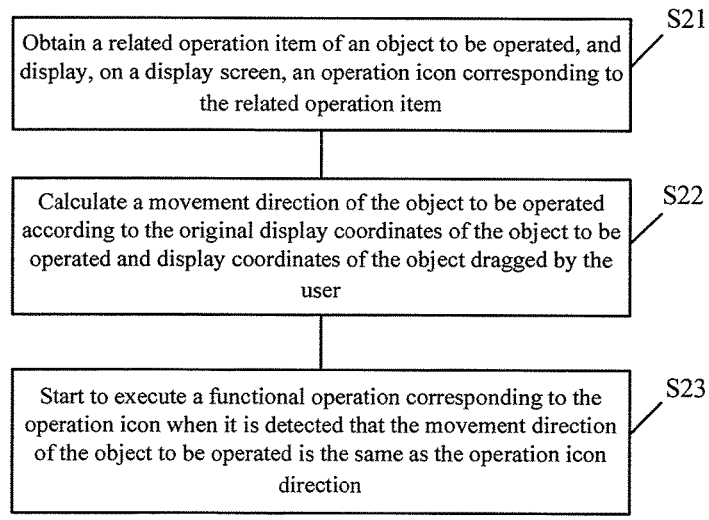
FIG. 2 is a schematic flowchart of a method for executing a program according to an embodiment of the present invention.

Referring to FIG. 2, an embodiment of the present invention provides a method for executing a program, including the following steps:

S21. Obtain a related operation item of an object to be operated, and display, on a display screen, an operation icon corresponding to the related operation item, where the object to be operated is a computer program operable by a user on the display screen, and a direction of pointing from an original display coordinate of the object to be operated towards a display coordinate of the operation icon is an operation icon direction.

S22. Calculate a movement direction of the object to be operated according to the original display coordinate of the object to be operated and a display coordinate of the object after being dragged by the user.

S23. Start to execute a functional operation corresponding to the operation icon when it is detected that the movement direction of the object to be operated is the same as the operation icon direction.

According to the embodiment of the present invention, the user drags an object to execute related function and action processing of a computer program, which can simplify steps of executing the computer program; moreover, the user-centered interaction ensures continuity of user thinking and operations, and makes the operations intuitive and natural.

Furthermore, the foregoing step S21 may specifically include:

analyzing a type and a state of the object to be operated, and obtaining the related operation item of the object to be operated;

generating an operation icon corresponding to the related operation item and a display coordinate of the operation icon; and displaying the operation icon on the display screen according to the display coordinate of the operation icon, where the operation icon direction corresponding to the operation icon is unique.

In a first optional implementation manner, after the foregoing step S23, the method further includes:

continuing to execute the functional operation corresponding to the operation icon if it is detected that the object to be operated moves continuously along the operation icon direction.

Furthermore, the method further includes:

continuing to execute the functional operation corresponding to the operation icon until completion if it is detected that the object to be operated moves along the operation icon direction to a region of the operation icon.

In a second optional implementation manner, after the foregoing step S23, the method further includes:

suspending executing the functional operation corresponding to the operation icon if it is detected that the display coordinate of the object to be operated remains unchanged and the object is not released by the user.

In a third optional implementation manner, after the foregoing step S23, the method further includes:

stopping executing the functional operation corresponding to the operation icon and rolling back the executed functional operation if it is detected that the object to be operated is released by the user without being moved to a region of the operation icon.

In a fourth optional implementation manner, the method further includes:

displaying, on the display screen, an indicative arrow whose direction is consistent with the operation icon direction when it is detected that the movement direction of the object to be operated is the same as the operation icon direction; after starting to execute the functional operation corresponding to the operation icon, prolonging a length of the indicative arrow according to a processing progress of the functional operation; and, in a process of rolling back the executed functional operation corresponding to the operation icon, shortening the length of the indicative arrow according to a rollback progress.

Specifically, after the functional operation corresponding to the operation icon starts to be executed, the length of the indicative arrow is prolonged synchronously according to the processing progress of the functional operation; and, in the process of rolling back the executed functional operation corresponding to the operation icon, the length of the indicative arrow is shortened synchronously according to the rollback progress.

It should be noted that "synchronously" here means that the arrow is prolonged if the functional operation continues to be processed, and the process is not necessarily "exactly synchronous". For example, it is possible that the arrow is prolonged by 1% of the whole length after 1% of the functional operation is processed.

In a fifth optional implementation manner, the method further includes:

when it is detected that the movement direction of the object to be operated is the same as the operation icon direction, displaying, on the display screen, an indicative text for prompting the user to perform an operation.

It should be noted that in the above embodiment, only one operation icon related to the object to be operated is taken as an example for description. The object to be operated may have multiple related operation items. That is, by analyzing the type and state of the object to be operated, a related operation set of the object to be operated can be obtained, where the related operation set includes at least one related operation item. Then, an operation icon corresponding to each related operation item and a display coordinate of the operation icon are generated, and each operation icon is displayed on the display screen according to the generated display coordinate. The operation icons are distributed near the object to be operated, and the operation icon direction corresponding to each operation icon is unique, for example, multiple operation icons are distributed on a circumference centered by the object to be operated.

In a sixth optional implementation manner, when the object to be operated has multiple related operation items, the method further includes: hiding other operation icons except the operation icon when it is detected that the movement direction of the object to be operated is the same as the operation icon direction.

According to the embodiment of the present invention, the user drags an object to execute the related function and action processing of a computer program, which can simplify steps of executing the computer program; moreover, the user-centered interaction ensures continuity of user thinking and operations, and makes the operations intuitive and natural. Furthermore, in this embodiment, when it is detected that the movement direction of the object to be operated is the same as a specific operation icon direction, other operation icons may be hidden and refrained from being displayed on the display screen, and therefore, the operation icon being executed currently is more intuitive, and the user can know the current operation state more conveniently.

The method for executing a program in the embodiment of the present invention is applicable to a computer system with a display screen, such as a computer or a mobile terminal, and the foregoing steps S21 to S23 described above may be executed by the computer system.

Figure 3A:
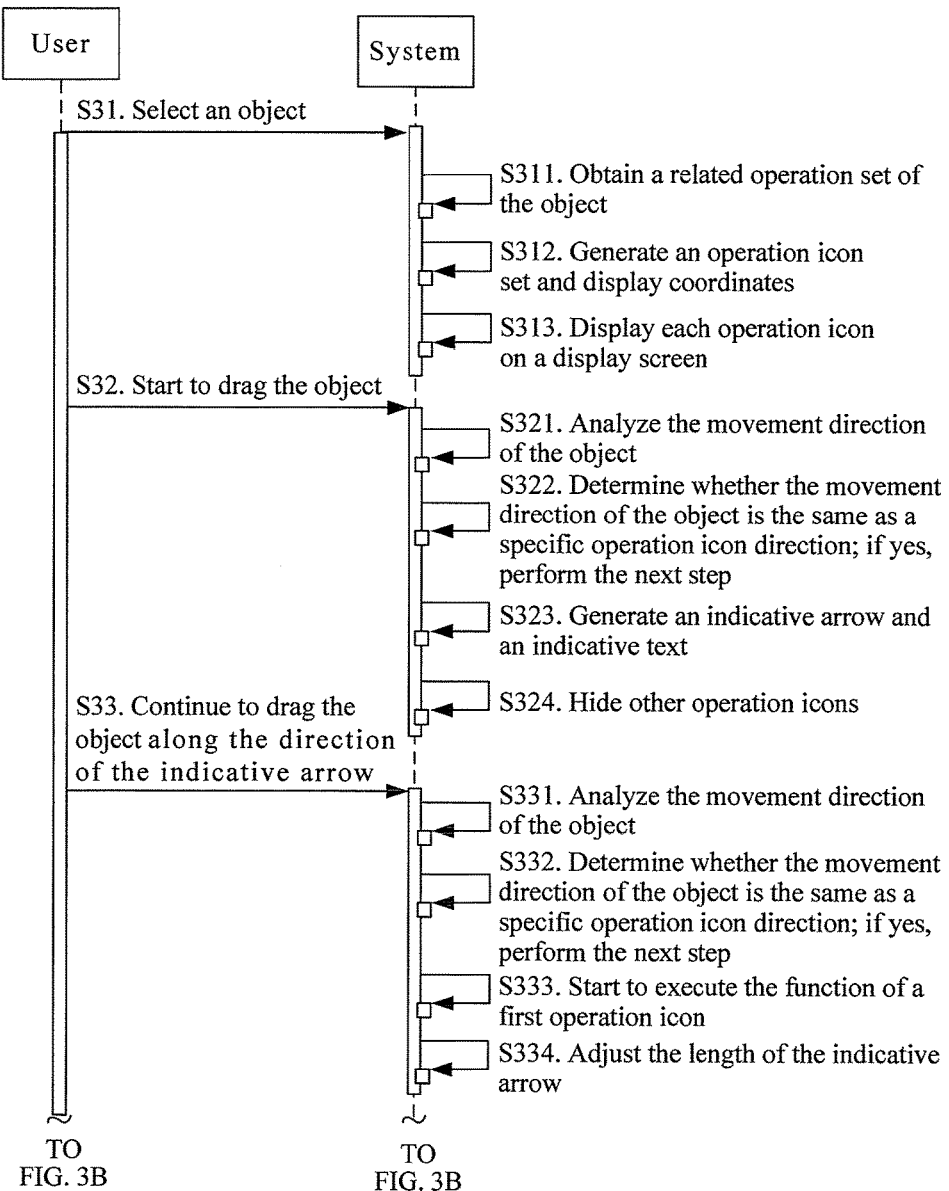
FIG. 3A-3B are schematic diagrams of drag-to-interact in a method for executing a program according to an embodiment of the present invention.
Figure 3B:
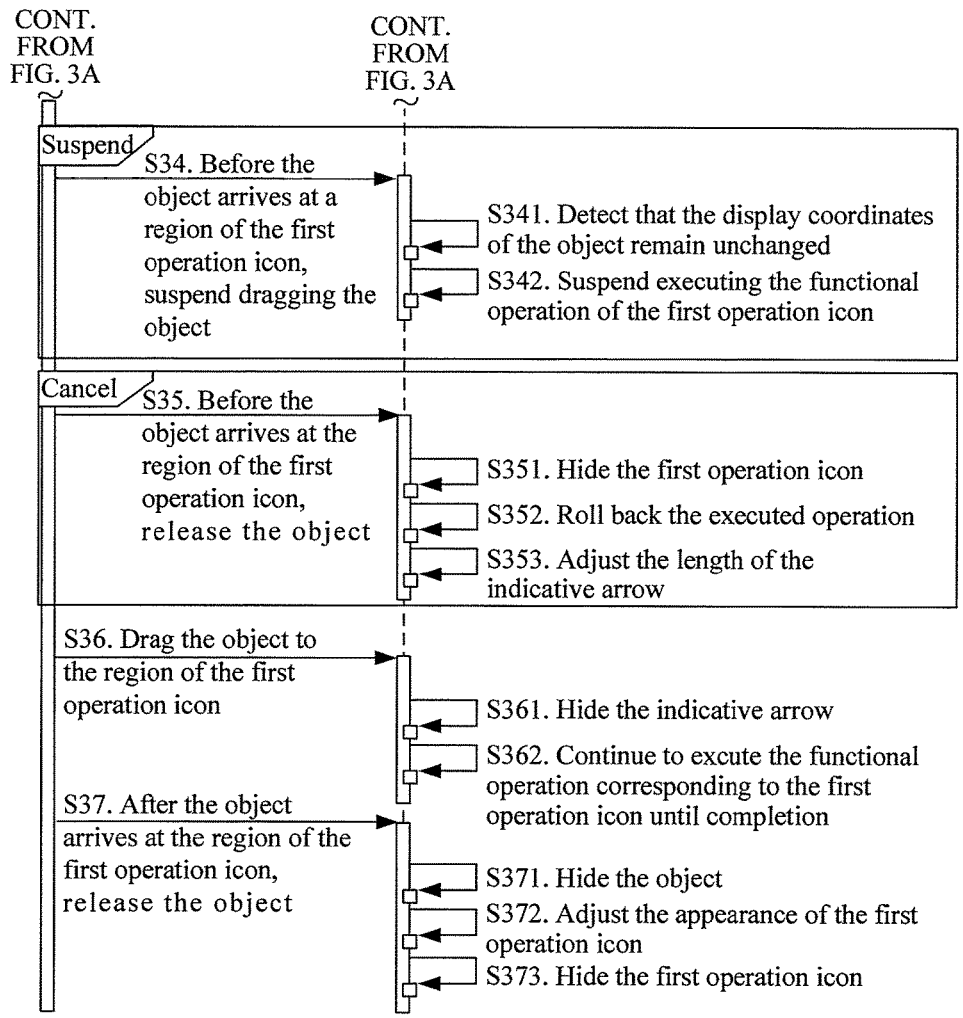

FIG. 3A-3B are schematic diagrams of drag-to-interact in a method for executing a program according to an embodiment of the present invention. A user interacts with a computer system (hereinafter referred to as "the system"), and steps of executing a computer program are as follows:

S31. The user selects an object in the system, where the object is an object to be operated.

S311. The system analyzes the type and state of the object, and obtains a related operation set of the object.

S312. The system generates an operation icon set corresponding to the related operation set and a display coordinate, where the operation icon set includes at least one operation icon.

Assuming that the operation icon set includes a first operation icon, a direction of pointing from the original display coordinate of the object towards the display coordinate of the first operation icon is an operation icon direction of the first operation icon. The operation icon direction of each operation icon is unique.

S313. The system displays each operation icon on the display screen according to the display coordinate of each operation icon in the operation icon set.

S32. The user starts to drag the object.

S321. The system analyzes the change of the coordinate after the object is dragged, calculates the direction from the original display coordinate of the object to the display coordinate of the object after being dragged by the user, and obtains a movement direction of the object.

S322. The system determines whether the movement direction of the object is the same as the operation icon direction of a specific operation icon; if yes, performs S323 to S324; and performs no operation if the movement direction of the object is different from the operation icon direction of any one of the operation icons.

For ease of description, it is assumed below that the movement direction of the object is the same as the operation icon direction of the first operation icon, that is, the user requests to execute a functional operation corresponding to the first operation icon.

S323. Generate an indicative arrow whose direction is consistent with the operation icon direction and an indicative text that is used for prompting the user to perform an operation, and display the indicative arrow and the indicative text on the display screen.

S324. The system hides other operation icons except the first operation icon.

S33. The user continues to drag the object along the direction of the indicative arrow.

S331. The system analyzes the change of the coordinate after the object is dragged, calculates the direction from the original display coordinate of the object to the display coordinate of the object after being dragged by the user, and obtains a movement direction of the object.

S332. The system determines whether the movement direction of the object is the same as the operation icon direction of the current first operation icon; if yes, performs S333 to S334; or, if no, performs no operation.

S333. The system starts to execute the functional operation corresponding to the first operation icon, and performs corresponding function or action processing.

S334. The system prolongs the length of the indicative arrow synchronously according to the processing progress of the functional operation corresponding to the first operation icon.

S34. Before the object arrives at a region of the first operation icon, the user suspends dragging the object.

S341. After starting to execute the functional operation corresponding to the first operation icon, the system detects that the display coordinate of the object remain unchanged and the object is not released by the user.

S342. The system suspends executing the functional operation corresponding to the first operation icon.

S35. Before the object arrives at the region of the first operation icon, the user releases the object.

S351. After starting to execute the functional operation corresponding to the operation icon, the system stops executing the functional operation corresponding to the first operation icon and hides the first operation icon if it is detected that the object is released by the user without being moved to the region of the operation icon.

S352. The system rolls back the executed functional operation corresponding to the first operation icon.

S353. The system shortens the length of the indicative arrow synchronously according to the rollback progress.

S36. The user drags the object to the region of the first operation icon.

S361. When it is detected that the object moves to the region of the first operation icon, the system hides the indicative arrow.

S362. The system continues to execute the functional operation corresponding to the first operation icon until completion.

S37. The user releases the object after dragging the object to the region of the first operation icon.

S371. The system detects that the object moves to the region of the first operation icon and the object is released by the user, and the system hides the object.

S372. The system adjusts the appearance (for example, changes the color or shape) of the first operation icon to indicate whether the functional operation corresponding to the first operation icon succeeds.

S373. The system hides the first operation icon.

Figure 4:
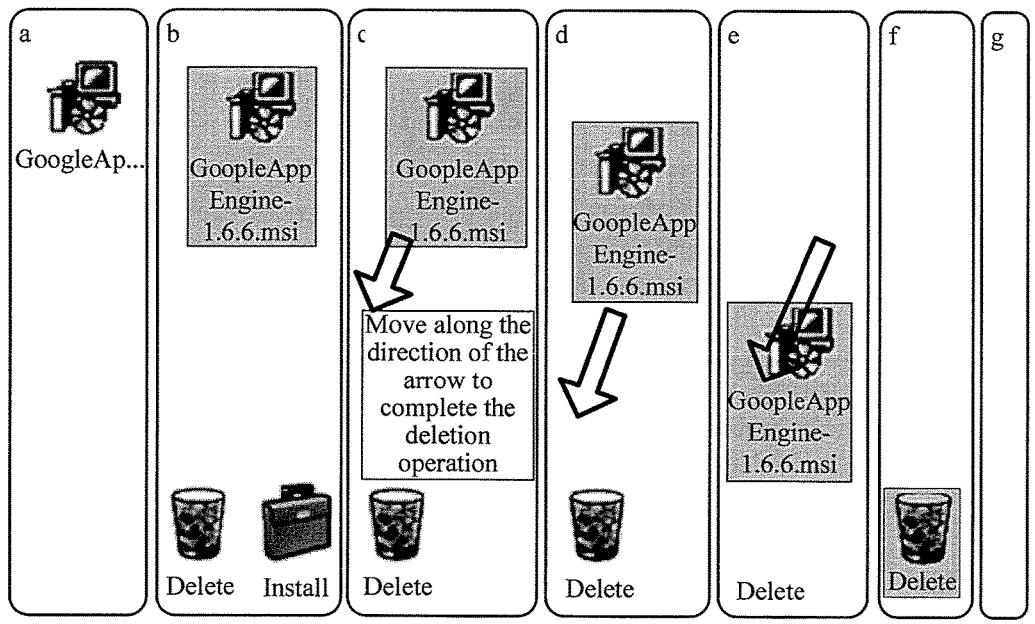
FIG. 4 is a schematic diagram of an application scenario of a method for executing a program according to an embodiment of the present invention.

FIG. 4 is a schematic diagram of an application scenario of a method for executing a program according to an embodiment of the present invention. This embodiment is described through an example where the object to be operated is an installation package icon of an application Google App Engine in the system.

A user interface a shown in FIG. 4 is a user interface on which the installation package icon of the application Google App Engine is not selected by the user.

A user interface b shown in FIG. 4 is a user interface on which the installation package icon of the application Google App Engine is selected by the user. After the installation package icon is selected, a "Delete" operation icon and an "Install" operation icon appear under or around the installation package icon, and the two operation icons have different operation icon directions.

A user interface c shown in FIG. 4 is a user interface on which the user starts to drag the installation package icon of the application Google App Engine. When the user starts to drag the installation package icon of the application Google App Engine along the direction of the "Delete" operation icon, an indicative arrow in an initialized size and an indicative text appear on the user interface, where the indicative text is: Move along the arrow direction to complete a deletion operation. In addition, the system hides the "Install" operation icon.

A user interface d shown in FIG. 4 is a user interface on which the user continues to drag the installation package icon of the application Google App Engine continuously along the direction of the "Delete" operation icon. In the dragging process, the system executes the operation of deleting the installation package of the application Google App Engine, and prolongs the length of the indicative arrow synchronously according to the progress of the deletion operation.

A user interface e shown in FIG. 4 is a user interface on which the user drags the installation package icon of the application Google App Engine to the region of the "Delete" operation icon. In this case, the length of the indicative arrow is also prolonged to the region of the "Delete" operation icon, and this state means that the system has finished the operation of deleting the installation package of the application Google App Engine and then a user interface f appears.

The user interface f shown in FIG. 4 is a user interface after the user releases the installation package icon of the application Google App Engine. In this case, the system hides the installation package icon of the application Google App Engine and the indicative arrow. In addition, the system changes the appearance (for example, changes the color) of the "Delete" operation icon, indicating that the installation package of the application Google App Engine is deleted successfully; and then a user interface g appears.

The user interface g shown in FIG. 4 is a user interface after the functional operation corresponding to the "Delete" operation icon succeeds. In this case, the system hides the "Delete" operation icon.

In addition, the user may suspend or stop the corresponding functional operation in the process of dragging the installation package icon of the application Google App Engine, as detailed below:

On the user interface d shown in FIG. 4, when the user suspends dragging the installation package icon of the application Google App Engine, the system detects that the display coordinate of the installation package icon of the application Google App Engine remain unchanged and the icon is not released by the user, and therefore, the system suspends executing the operation of deleting the installation package of the application Google App Engine.

On the user interface d shown in FIG. 4, if the user releases the installation package icon of the application Google App Engine before the installation package icon of the application Google App Engine is dragged to the region of the "Delete" operation icon. In this case, the system detects that the installation package icon of the application Google App Engine is released by the user without being moved to the region of the "Delete" operation icon, and therefore, the system stops executing the operation of deleting the installation package of the application Google App Engine, rolls back the executed deletion operation, and at the same time, shortens the length of the indicative arrow synchronously according to the progress of the deletion operation. After rolling back the executed deletion operation, the system returns to the user interface a shown in FIG. 4.

In the method for executing a program in the above embodiment, the user may execute related function and actions processing of the computer program by dragging an object. According to the state of the object after being dragged by the user, the system uses an indicative arrow to vividly render the process of executing the computer program, for example, indicate that the program is being processed, suspended or rolled back, and indicate the progress of the processing. The indicative arrow may be a substitute of a pop-up menu, a progress bar, a waiting icon, or the like, in the prior art. The system can express success or failure of the operation vividly by changing the appearance of the operation icon.

The above embodiment is applicable to interaction operations of a computer program, and particularly, to interaction operations whose duration is less than five seconds. When the user starts to drag a computer program icon along an operation icon direction, the system starts to execute the functional operation corresponding to the operation icon; when the user continues to drag the computer program icon to the region of the operation icon continuously, the execution of the functional operation corresponding to the operation icon is generally completed.

The method for dragging to execute a program in the above embodiment simplifies steps of executing the computer program; moreover, the user-centered interaction ensures continuity of user thinking and operations, and makes the operations intuitive and natural.

In addition, in the method for executing a program in the embodiment of the present invention, in the foregoing step S23, when it is detected that the movement direction of the object to be operated is the same as the operation icon direction of a specific operation icon, the interaction operation duration of the operation icon may be obtained, and the interaction operation duration may be compared with a set duration threshold. If the interaction operation duration is shorter than the duration threshold, a functional operation corresponding to the operation icon starts to be executed when it is detected that the movement direction of the object to be operated is the same as a specific operation icon direction. If the interaction operation duration is greater than or equal to the duration threshold, a functional operation corresponding to the operation icon starts to be executed when it is detected that the object to be operated moves to the region of the operation icon, and a progress bar is provided to indicate the operation progress.

The present invention further provides an apparatus for executing a program, which can implement all processes of the method for dragging to execute a program in the above embodiment.

Figure 5:
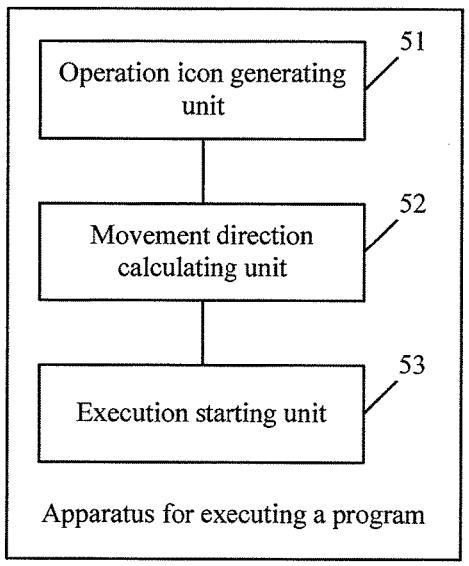
FIG. 5 is a schematic structural diagram of an apparatus for executing a program according to an embodiment of the present invention.

Referring to FIG. 5, an embodiment of the present invention provides the apparatus for executing a program, including an operation icon generating unit 51, a movement direction calculating unit 52, and an executing unit 53, as detailed below:

The operation icon generating unit 51 is configured to obtain a related operation item of an object to be operated, and display, on a display screen, an operation icon corresponding to the related operation item, where the object to be operated is a computer program operable by a user on the display screen, and a direction of pointing from an original display coordinate of the object to be operated towards display a coordinate of the operation icon is an operation icon direction.

The movement direction calculating unit 52 is configured to: according to the original display coordinate of the object to be operated and a display coordinate of the object after being dragged by the user, calculate a movement direction of the object to be operated.

The execution starting unit 53 is configured to start to execute a functional operation corresponding to the operation icon when it is detected that the movement direction of the object to be operated is the same as the operation icon direction.

According to the embodiment of the present invention, the user drags an object to execute related function and action processing of a computer program, which can simplify steps of executing the computer program; moreover, the user-centered interaction ensures continuity of user thinking and operations, and makes the operations intuitive and natural.

Figure 6:
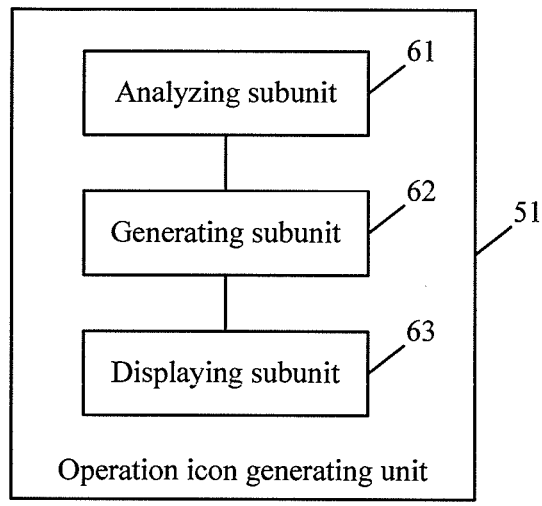
FIG. 6 is a schematic structural diagram of an embodiment of an operation icon generating unit of the apparatus for executing a program shown in FIG. 5.

Referring to FIG. 6, an embodiment of the present invention provides an operation icon generating unit 51, including an analyzing subunit 61, a generating subunit 62, and a displaying subunit 63, as detailed below:

The analyzing subunit 61 is configured to analyze a type and a state of an object to be operated, and obtain a related operation item of the object to be operated.

The generating subunit 62 is configured to generate an operation icon corresponding to the related operation item and a display coordinate of the operation icon.

The displaying subunit 63 is configured to display the operation icon on the display screen according to the display coordinate of the operation icon, where the operation icon direction corresponding to the operation icon is unique.

Figure 7:
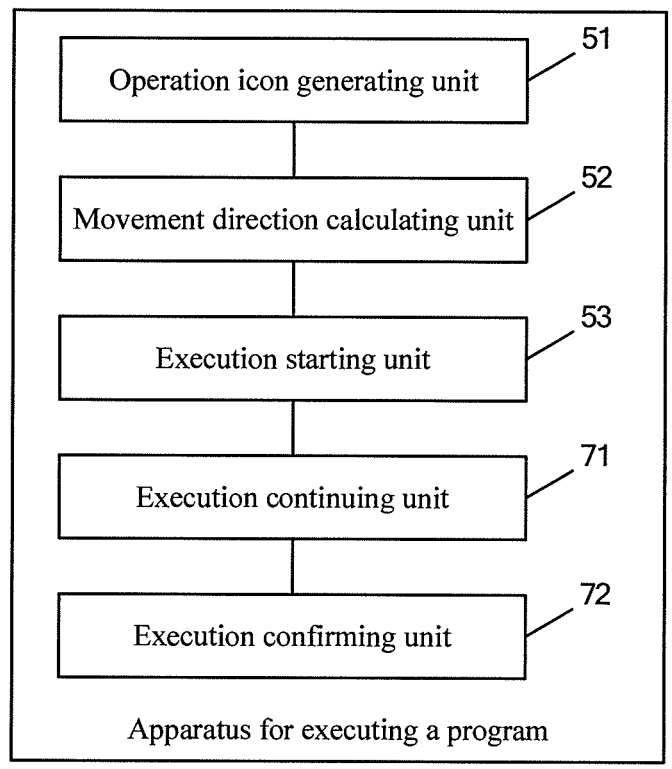
FIG. 7 is a schematic structural diagram of another apparatus for executing a program according to an embodiment of the present invention.

Referring to FIG. 7, an embodiment of the present invention provides another apparatus for executing a program, which not only includes the operation icon generating unit 51, the movement direction calculating unit 52, and the executing unit 53 in the above embodiment, but also includes:

an execution continuing unit 71, configured to: after the functional operation corresponding to the operation icon starts to be executed when it is detected that the movement direction of the object to be operated is the same as the operation icon direction, if it is detected that the object to be operated moves continuously along the operation icon direction, continue to execute the functional operation corresponding to the operation icon.

Furthermore, the apparatus may further include:

an execution confirming unit 72, configured to continue to execute the functional operation corresponding to the operation icon until completion if it is detected that the object to be operated moves along the operation icon direction to a region of the operation icon.

Figure 8:
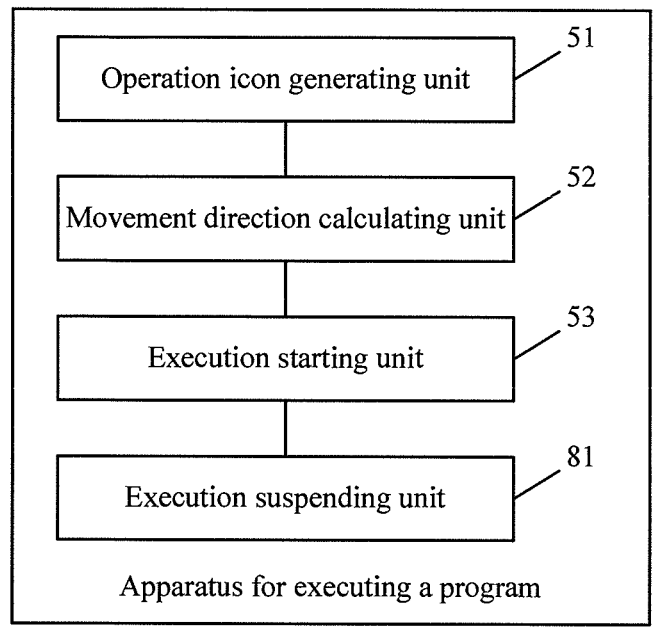
FIG. 8 is a schematic structural diagram of still another apparatus for executing a program according to an embodiment of the present invention.

Referring to FIG. 8, an embodiment of the present invention provides still another apparatus for executing a program, which not only includes the operation icon generating unit 51, the movement direction calculating unit 52, and the executing unit 53 in the above embodiment, but also includes:

an execution suspending unit 81, configured to: after the functional operation corresponding to the operation icon starts to be executed when it is detected that the movement direction of the object to be operated is the same as the operation icon direction, if it is detected that a display coordinate of the object to be operated remain unchanged and the object is not released by the user, suspend executing the functional operation corresponding to the operation icon.

Figure 9:
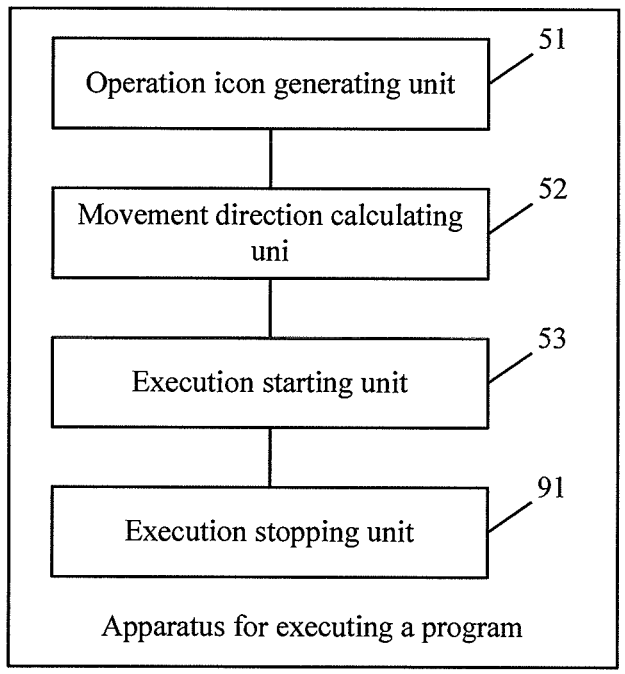
FIG. 9 is a schematic structural diagram of yet another apparatus for executing a program according to an embodiment of the present invention.

Referring to FIG. 9, an embodiment of the present invention provides yet another apparatus for executing a program, which not only includes the operation icon generating unit 51, the movement direction calculating unit 52, and the executing unit 53 in the above embodiment, but also includes:

an execution stopping unit 91, configured to: after the functional operation corresponding to the operation icon starts to be executed when it is detected that the movement direction of the object to be operated is the same as the operation icon direction, if it is detected that the object to be operated is released by the user without being moved to a region of the operation icon, stop executing the functional operation corresponding to the operation icon and roll back the executed functional operation.

An embodiment of the present invention further provides an apparatus for executing a program, which not only includes the operation icon generating unit 51, the movement direction calculating unit 52, and the executing unit 53 in the above embodiment, but also may include at least two of: the execution continuing unit 71, the execution confirming unit 72, the execution suspending unit 81, and the execution stopping unit 91 that are provided in the above embodiments.

In addition, the apparatus for executing a program in the above embodiments may further include at least one of: an arrow indicating unit, an arrow synchronizing unit, a text indicating unit, and an icon hiding unit, as detailed below:

The arrow indicating unit is configured to display, on the display screen, an indicative arrow whose direction is consistent with the operation icon direction when it is detected that the movement direction of the object to be operated is the same as the operation icon direction;

The arrow synchronizing unit is configured to: after the functional operation corresponding to the operation icon starts to be executed, prolong a length of the indicative arrow synchronously according to a processing progress of the functional operation; and in a process of rolling back the executed functional operation corresponding to the operation icon, shorten the length of the indicative arrow synchronously according to a rollback progress.

The text indicating unit is configured to: when it is detected that the movement direction of the object to be operated is the same as the operation icon direction, display, on the display screen, an indicative text for prompting the user to perform an operation.

The icon hiding unit is configured to hide other operation icons except the operation icon when it is detected that the movement direction of the object to be operated is the same as the operation icon direction.

Figure 10:
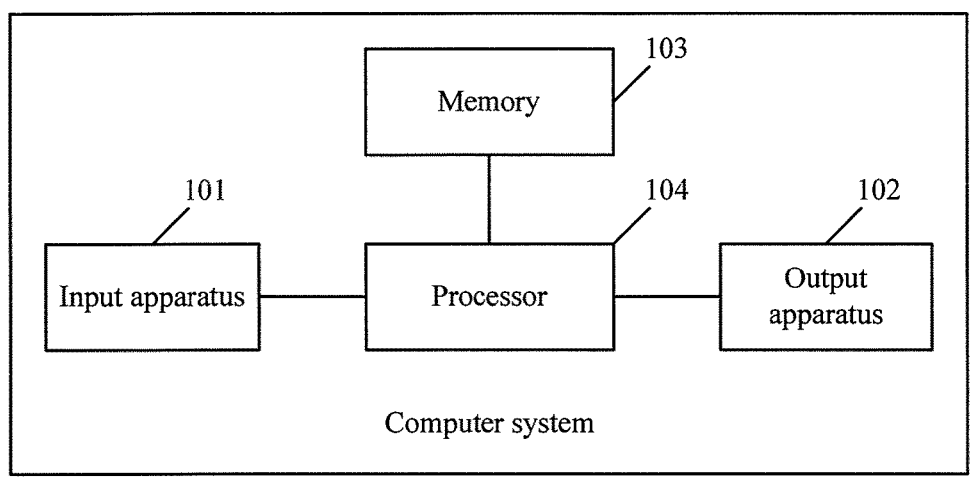
FIG. 10 is a schematic structural diagram of a computer system according to an embodiment of the present invention.

Referring to FIG. 10, an embodiment of the present invention provides a computer system, including an input apparatus 101, an output apparatus 102, a memory 103, and a processor 104, where the processor 104 can execute the following steps: obtaining a related operation item of an object to be operated, and displaying, on a display screen, an operation icon corresponding to the related operation item, where the object to be operated is a computer program operable by a user on the display screen, and a direction of pointing from an original display coordinate of the object to be operated towards display a coordinate of the operation icon is an operation icon direction; according to the original display coordinate of the object to be operated and a display coordinate of the object after being dragged by the user, calculating a movement direction of the object to be operated; and starting to execute a functional operation corresponding to the operation icon when it is detected that the movement direction of the object to be operated is the same as the operation icon direction.

More detailed technical solutions for the processor 104 to execute a program may include but are not limited to the detailed descriptions about the embodiments shown in FIG. 2, FIGS. 3A-3B, and FIG. 4.

The memory 103 is configured to store a program to be executed by the processor 104, and furthermore, the memory 103 may further store a result generated by the processor 104 in the computing process.

Apart from the connection manners shown in FIG. 10, in other embodiments of the present invention, the input apparatus 101, the output apparatus 102, the memory 103, and the processor 104 may be connected by using a bus. The bus may be an ISA (Industry Standard Architecture, industry standard architecture) bus, a PCI (Peripheral Component, peripheral component interconnection) bus, or an EISA (Extended Industry Standard Architecture, extended industry standard architecture) bus, or the like. The bus may be one or more physical lines, and, when the bus is multiple physical lines, the bus may be categorized into address bus, data bus, control bus, and so on.

An embodiment of the present invention further provides a computer storage medium. The computer storage medium stores a computer program, and the computer program can execute the steps in the embodiment shown in FIG. 2.

In summary, in the method for executing a program and the apparatus for executing a program in the embodiments of the present invention, a related operation icon of an object to be operated is displayed near the object to be operated on a display screen; by detecting the direction in which a user drags the object to be operated and the region of the operation icon to which the object is dragged, the function and action processing corresponding to the operation icon is implemented. According to the embodiments of the present invention, the user drags an object to execute the related function and action processing of a computer program, which can simplify steps of executing the computer program; moreover, the user-centered interaction ensures continuity of user thinking and operations, and makes the operations intuitive and natural. When it is detected that the movement direction of the object to be operated is the same as a specific operation icon direction, other operation icons may be hidden and refrained from being displayed on the display screen, and therefore, the operation icon being executed currently is more intuitive, and the user can know the current operation state more conveniently. An arrow or another indicative text may also be displayed as required, so that the user can know the operation progress conveniently.

The embodiments in this Specification are all described in a progressive manner, mutual reference may be made to the same or similar part of the embodiments, and each embodiment focuses on differences from other embodiments. In particular, the apparatus and system embodiments are basically similar to the method embodiments and are therefore described briefly, and reference may be made to the corresponding parts in the description of the method embodiments.

It should be noted that the described apparatus embodiments are merely exemplary, the units described as separate parts may be physically separated or not, and the parts displayed as units may be physical units or not, that is, may be placed in one location or distributed to a plurality of network elements. Part or all of the modules may be selected according to actual needs to achieve the objectives of the solutions of the embodiments. In addition, in the accompanying drawings of the apparatus embodiments in the present invention, the connection relationships between modules represent existence of communicative connections between the modules, and may be physically realized by one or more communication buses or signal cables. A person of ordinary skill in the art may understand and implement the embodiments without making creative efforts.

According to the descriptions of the foregoing implementation manners, a person skilled in the art can clearly understand that the present invention may be implemented by software in addition to necessary universal hardware, or by dedicated hardware including a dedicated integrated circuit, a dedicated CPU, a dedicated memory, and dedicated parts and components. Generally, all functions performed by a computer program can be easily implemented by corresponding hardware, and the specific hardware structure for implementing the same function is diverse, such as an analog circuit, a digital circuit, a dedicated circuit, and so on. However, for the present invention, in more circumstances, a software program is a preferred implementation. Based on such understandings, the essence of the technical solutions of the present invention or the part that makes contributions to the prior art can be embodied in a software product. The computer software product may be stored in a readable storage medium such as a computer floppy disk, a USB flash disk, a mobile hard disk, a read-only memory (ROM, Read-Only Memory), a random access memory (RAM, Random Access Memory), a magnetic disk, or an optical disk, where the storage medium incorporates several instructions enabling a computer device (such as a personal computer, a server, or a network device) to perform the method specified in each embodiment of the present invention.

The foregoing descriptions are merely specific embodiments of the present invention, and are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for executing a program, the method comprising:
   obtaining a related operation item of an object to be operated, and displaying, on a display screen, an operation icon corresponding to the related operation item, wherein the object to be operated is a computer program operable by a user on the display screen, and a direction of pointing from an original display coordinate of the object to be operated towards a display coordinate of the operation icon is an operation icon direction;
   according to the original display coordinate of the object to be operated and a display coordinate of the object after being dragged by the user, calculating a movement direction of the object to be operated; and
   starting but not completing execution of a functional operation corresponding to the operation icon when it is detected that the movement direction of the object to be operated is the same as the operation icon direction;
   displaying, on the display screen, an indicative arrow whose direction is consistent with the operation icon direction when it is detected that the movement direction of the object to be operated is the same as the operation icon direction; and
   after starting to execute the functional operation corresponding to the operation icon, extending a length of the indicative arrow according to a processing progress of the functional operation; and in a process of rolling back the executed functional operation corresponding to the operation icon, shortening the length of the indicative arrow according to a rollback progress.

2. The method according to claim 1, wherein: obtaining a related operation item of an object to be operated, and displaying, on a display screen, an operation icon corresponding to the related operation item, comprises:
- analyzing a type and a state of the object to be operated, and obtaining the related operation item of the object to be operated;
- generating the operation icon corresponding to the related operation item and the display coordinate of the operation icon according to the related operation item; and
- displaying the operation icon on the display screen according to the display coordinate of the operation icon, wherein the operation icon direction corresponding to the operation icon is unique.

3. The method according to claim 1, further comprising:
- continuing to execute the functional operation corresponding to the operation icon if it is detected that the object to be operated moves continuously along the operation icon direction.

4. The method according to claim 3, further comprising:
- continuing to execute the functional operation corresponding to the operation icon until completion if it is detected that the object to be operated moves along the operation icon direction to a region of the operation icon.

5. The method according to claim 1, further comprising:
- suspending executing the functional operation corresponding to the operation icon if it is detected that the display coordinate of the object to be operated remains unchanged and the object is not released by the user.

6. The method according to claim 1, further comprising:
- stopping executing the functional operation corresponding to the operation icon and rolling back the executed functional operation, if it is detected that the object to be operated is released by the user without being moved to a region of the operation icon.

7. The method according to claim 1, further comprising:
- when it is detected that the movement direction of the object to be operated is the same as the operation icon direction, displaying, on the display screen, an indicative text for prompting the user to perform an operation.

8. The method according to claim 1, further comprising:
- hiding other operation icons except the operation icon when it is detected that the movement direction of the object to be operated is the same as the operation icon direction.

9. An apparatus for executing a program, the apparatus comprising:
- a processor; and
- a memory, wherein the processor is configured to
- obtain a related operation item of an object to be operated, and display, on a display screen, an operation icon corresponding to the related operation item, wherein the object to be operated is a computer program operable by a user on the display screen, and a direction of pointing from an original display coordinate of the object to be operated towards display a coordinate of the operation icon is an operation icon direction;
- according to the original display coordinate of the object to be operated and a display coordinate of the object after being dragged by the user, calculate a movement direction of the object to be operated; and
- start but not complete execution of a functional operation corresponding to the operation icon when it is detected that the movement direction of the object to be operated is the same as the operation icon direction;
- display, on the display screen, an indicative arrow whose direction is consistent with the operation icon direction when it is detected that the movement direction of the object to be operated is the same as the operation icon direction; and
- after starting to execute the functional operation corresponding to the operation icon, extend a length of the indicative arrow according to a processing progress of the functional operation; and in a process of rolling back the executed functional operation corresponding to the operation icon, shortening the length of the indicative arrow according to a rollback progress.

10. The apparatus according to claim 9, wherein the processor is further configured to:
- analyze a type and a state of the object to be operated, and obtain the related operation item of the object to be operated;
- generate the operation icon corresponding to the related operation item and the display coordinate of the operation icon according to the related operation item; and
- display the operation icon on the display screen according to the display coordinate of the operation icon, wherein the operation icon direction corresponding to the operation icon is unique.

11. The apparatus according to claim 9, wherein the processor is further configured to:
- continue to execute the functional operation corresponding to the operation icon if it is detected that the object to be operated moves continuously along the operation icon direction.

12. The apparatus according to claim 11, wherein the processor is further configured to:
- continue to execute the functional operation corresponding to the operation icon until completion if it is detected that the object to be operated moves along the operation icon direction to a region of the operation icon.

13. The apparatus according to claim 9, wherein the processor is further configured to:
- suspend executing the functional operation corresponding to the operation icon if it is detected that the display coordinate of the object to be operated remains unchanged and the object is not released by the user.

14. The apparatus according to claim 9, wherein the processor is further configured to:
- stop executing the functional operation corresponding to the operation icon and roll back the executed functional operation if it is detected that the object to be operated is released by the user without being moved to a region of the operation icon.

15. The apparatus according to claim 9, wherein the processor is further configured to:
- when it is detected that the movement direction of the object to be operated is the same as the operation icon direction, display, on the display screen, an indicative text for prompting the user to perform an operation.

16. The apparatus according to claim 9, wherein the processor is further configured to:
- hide other operation icons except the operation icon when it is detected that the movement direction of the object to be operated is the same as the operation icon direction.

* * * * *